United States Patent
Cho et al.

(10) Patent No.: US 6,178,087 B1
(45) Date of Patent: Jan. 23, 2001

(54) MULTIMEDIA APPARATUS USING A PORTABLE COMPUTER

(75) Inventors: Kwan-Hwi Cho, Ansan; Nam-Mi Kim, Seoul, both of (KR)

(73) Assignee: Samsung Electronics Co. Ltd., Suwon (KR)

(*) Notice: Under 35 U.S.C. 154(b), the term of this patent shall be extended for 0 days.

(21) Appl. No.: 09/170,032

(22) Filed: Oct. 13, 1998

(30) Foreign Application Priority Data

Oct. 13, 1997 (KR) .................................................. 97-52254

(51) Int. Cl.[7] ...................................................... H05K 5/00
(52) U.S. Cl. ......................... 361/686; 361/683; 361/681; 361/680; 312/223.1
(58) Field of Search .................................... 361/681, 680, 361/683, 686; 364/705.01, 705.08; 312/223.1, 223.2

(56) References Cited

U.S. PATENT DOCUMENTS

| | | | |
|---|---|---|---|
| 5,355,279 | * 10/1994 | Lee et al. | 361/681 |
| 5,583,744 | * 12/1996 | Oguchi et al. | 361/683 |
| 5,586,002 | * 12/1996 | Notarianni | 361/681 |
| 5,808,861 | * 9/1998 | Kakajima et al. | 361/680 |
| 5,809,245 | * 9/1998 | Zenda | 395/200.47 |
| 5,812,371 | * 9/1998 | Chen et al. | 361/686 |

* cited by examiner

*Primary Examiner*—Leo P. Picard
*Assistant Examiner*—Tung Minh Bui
(74) *Attorney, Agent, or Firm*—Robert E. Bushnell, Esq.

(57) ABSTRACT

The present invention relates to a multimedia apparatus in which a user is enabled to use the portable computer more readily by mounting or dismounting various kinds of multimedia apparatus. The portable computer is designed so as to enable the user to use the portable computer detached from or mounted on a stand. The portable computer has a first connection part in a lower part thereof and a stand having a second connection part to which the first connection part of the portable computer is mounted or dismounted. Further features include the ability to mount or dismount an electrophotographic pen, a printer connector with cover, a rotatable battery, a light receiving part, and an auxiliary peripheral device.

18 Claims, 7 Drawing Sheets

MULTIMEDIA APPARATUS USING A PORTABLE COMPUTER

CLAIM OF PRIORITY

This application makes reference to, incorporates the same herein, and claims all benefits accruing under 35 U.S.C. §119 from my application entitled *Multimedia Apparatus Using Portable Computer* filed with the Korean Industrial Property Office on Oct. 13, 1997 and there duly assigned Serial No. P97-52254 by that Office.

BACKGROUND OF THE INVENTION

1. Technical Field

The present invention relates to a multimedia apparatus using a portable computer and, more particularly, to a multimedia apparatus using a portable computer and designed to mount and dismount the portable computer on a stand, the apparatus being equipped with a stand so that the portable computer can be used mounted or dismounted.

2. Related Art

Recently, with the rapid spread of the desktop computer, portable computers which are easy to transport have also become widely used. The portable computer can be in the form of a notebook computer or a hand held computer.

The portable computer is designed in such a size that the user can handle it simply by hand, and particularly so that it can be conveniently carried from place to place, while performing the general function of the desktop computer.

However, lately hand phones and cameras are being developed and supplied. Cameras range from analog cameras to digital cameras. Moreover, information generated from the hand phone and the camera needs to be readily edited by a computer.

As a result, when pictures are photographed with a digital camera, the photographed pictures are required to be edited on the spot and right away. Also, a communication device such as a hand phone often is required to conduct business more efficiently and should be mounted on the portable computer for convenient use.

Consequently, these devices should be carried with and mounted or dismounted on the portable computer for easy use.

SUMMARY OF THE INVENTION

Accordingly, in order to overcome such drawbacks in the art, it is an object of the present invention to enable a user to use a portable computer detached from a stand and to use the portable computer mounted on the stand.

To achieve these and other advantages in accordance with the purpose of the present invention, as embodied and broadly described, there is provided a portable computer which is so designed as to enable the user to use the portable computer detached from the stand and to use the portable computer mounted on the stand. The portable computer has a first connection part in the lower part thereof and a second connection part formed in the stand to enable the second connection part to be engaged with or disengaged from the first connection part of the portable computer.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

It will be apparent to those skilled in the art that various modifications can be made in the multimedia apparatus utilizing a portable computer without departing from the spirit of the invention. Thus, it is intended that the present invention cover such modifications, as well as variations thereof, within the scope of the appended claims and their equivalents.

A detailed description of an embodiment of the present invention will now be described in conjunction with the attached drawings.

Figure 1:
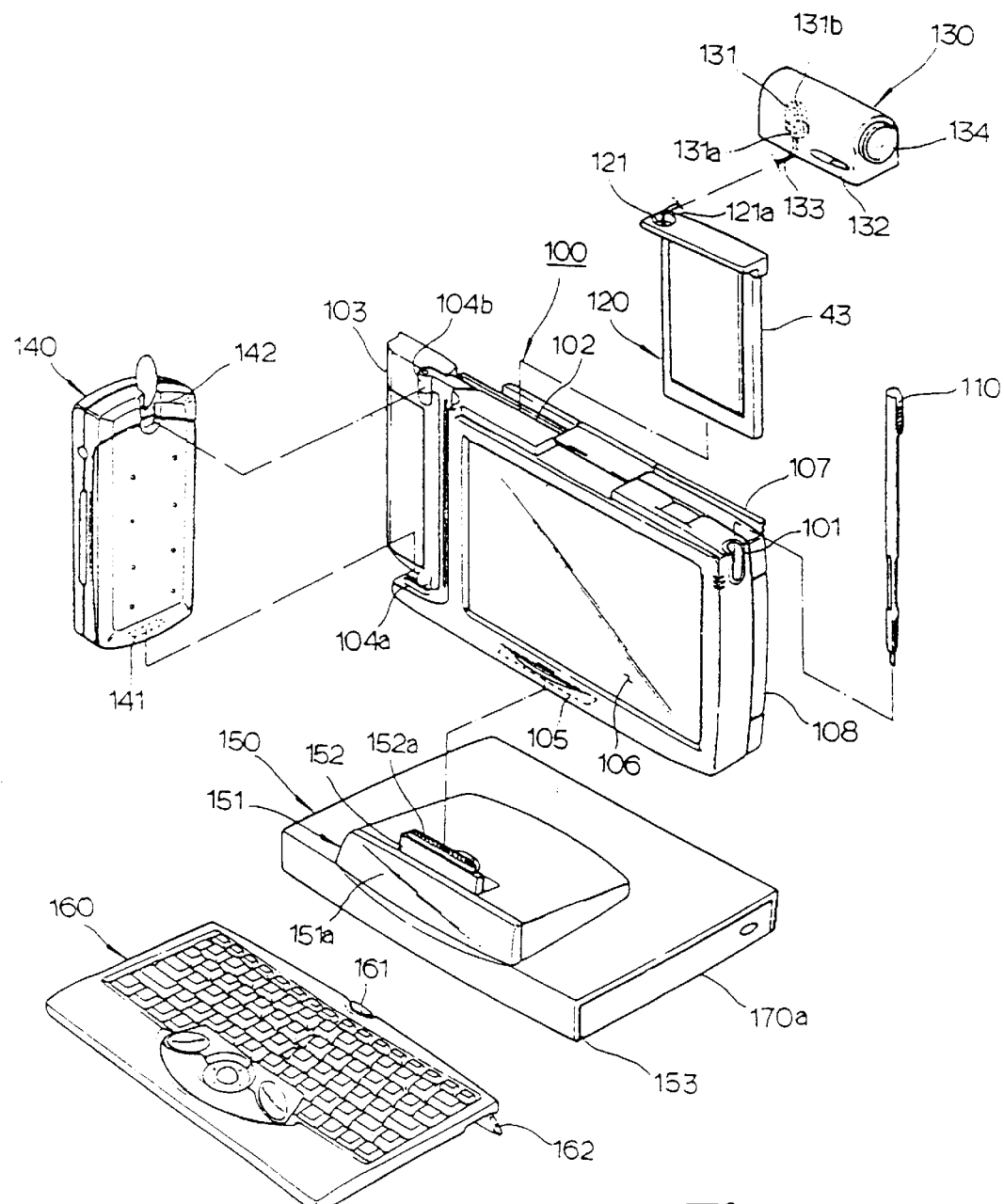
FIG. 1 is a disassembled view of a multimedia apparatus using a portable computer according to the present invention.

In FIG. 1, a multimedia apparatus using a portable computer according to the present invention is so constituted as to enable the user to use the portable computer 100 detached from the stand 150 and to use the portable computer 100 mounted on the stand 150. A first connection part 105 is formed on the lower part of the computer 100 and a second connection part 152 is formed on the stand 150 in order to facilitate mounting of the portable computer 100 on or its detachment from the stand 150. More particularly, portable computer 100 has the following: a mounting hole 101 formed on the upper right side thereof; a hand phone mounting part 104*a* and a hinge 104*b* formed on the left side; a first connection part 105 formed on the lower side; an electromagnetic pen 110 which can be inserted into the mounting hole 101 formed on the upper right side of the portable computer 100; a PCMCIA card 120 which has a hole 121 formed on the upper side thereof and which is mounted or dismounted in a guided manner on a mounting part 102 formed on the upper left side of the portable computer 100; a digital camera 130 which has a hinge 131 which can be mounted on the hole 121 so that digital camera 130 is rotatable; a hand phone 140 which has a female connection part 141 which is mounted on or dismounted from the hand phone mounting or dismounting part 104*a* formed on the lower left side of the portable computer 100, and which has a mounting or dismounting part 142 mounted on hinge 104*b* formed on the upper left side; stand 150 which has a mounting part 151; a light receiving part 151 *a* for receiving infra red (IR)transmitted from the outside; a second connection part 152 which can be mounted or dismounted on the first connection part 105 formed on the lower side of the portable computer 100; and a keyboard 160, which has an IR radiating part 161 which generates IR as a result of use of keyboard 160 by a user.

A cover 108 for a printer connector (not shown) is formed on the right side of the portable computer 100, and a battery 103 is mounted on and rotatably fixed to the hinge 104b formed on the left side for providing a source of electricity.

Further, the stand 150 has a mounting or dismounting part 153 for an auxiliary peripheral device (not shown). A floppy disk drive (FDD) or a digital video disk player (DVDP) can be mounted or dismounted on part 153. The mounting part 151 formed on the upper side of stand 150 is inclined at a fixed angle in order that an LCD panel 106 mounted thereon is oriented at an angle suitable to the users.

The present invention will be discussed in more detail in conjunction with examination of the attached drawings as follows.

Figure 2:
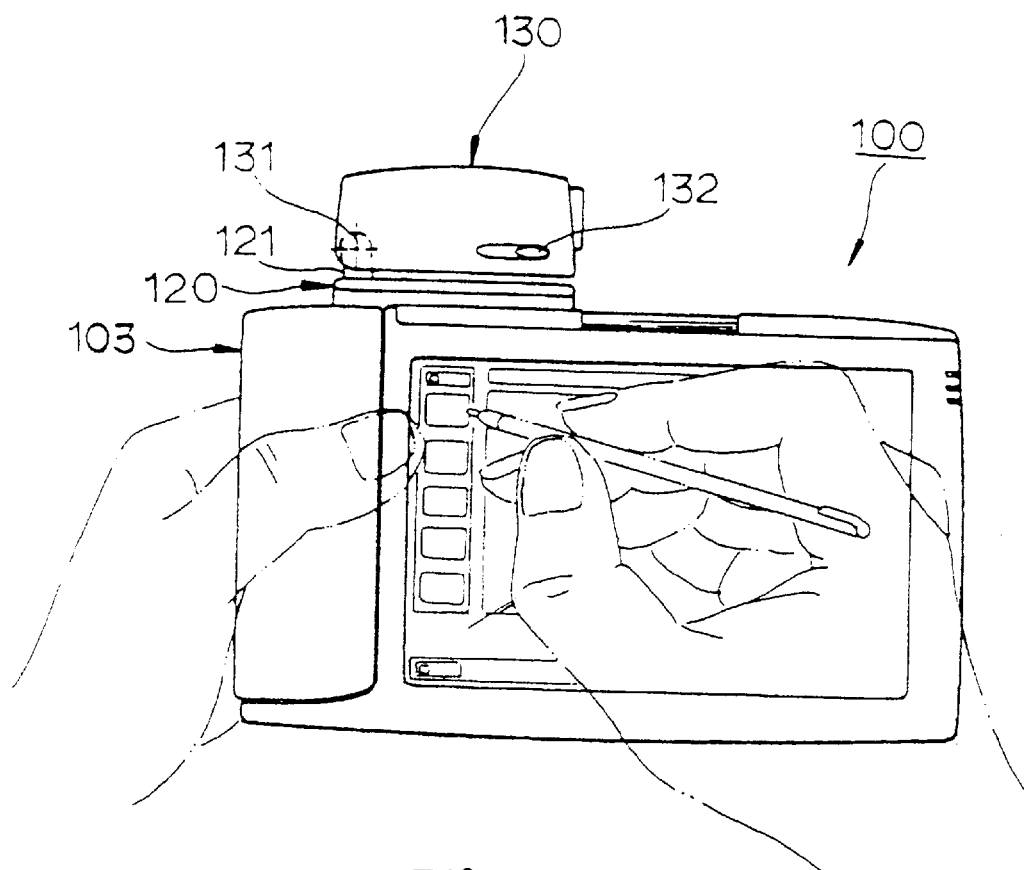
FIG. 2 is a front view of the portable computer illustrated in FIG. 1.
Figure 3:
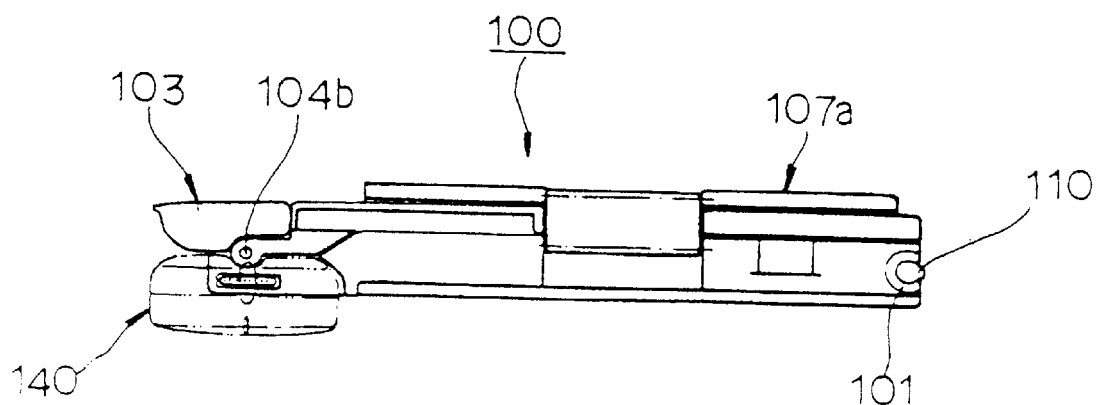
FIG. 3 is a plan view of the portable computer illustrated in FIG. 2.

As seen in FIG. 2 or FIG. 3, a mounting hole 101 formed on the upper right side of the portable computer 100 corresponds to the exterior diameter of the electromagnetic pen 110, and is used to store the pen 110 during time of non-use. A space corresponding to the exterior size of the PCMCIA card 120 is formed by the mounting part 102 (FIG. 1) located on the upper left side of the portable computer 100 so that the PCMCIA card 120 can be mounted on or dismounted from portable computer 100.

In the space in which the PCMCIA card 120 is going to be mounted, a connector (not illustrated) is provided for conducting signals transmitted from the PCMCIA card 120. That is, when the PCMCIA card 120 is mounted on portable computer 100, signals can be transmitted to circuitry in the portable computer 100.

The hinge 131 formed on the digital camera 130 is mounted in hole 121 formed on the PCMCIA card 120 after the PCMCIA card 120 has been mounted on the portable computer 100. Thus, when the digital camera 130 is mounted on the PCMCIA card 120, it can be rotated in the right-left and up-down directions around the hinge 131. A button 132 is used to control the zoom in/out function of the digital camera 130.

When the digital camera 130 is mounted in the hole 121 formed on the PCMCIA card 120, signals generated by the digital camera 130 are transmitted to the portable computer 100 via the PCMCIA card 120 and a cable 133.

Signals transmitted to the portable computer 100 can be edited by using various application programs. That is, the data corresponding to signals transmitted by digital camera 130, after being chosen by an application program by using electromagnetic pen 110, can be edited and stored. In addition, a printer connector (not illustrated) for printing edited data can be protected by the print connector cover 107.

On the left side of the portable computer 100, the battery 103 is fixed and can be rotated around the hinge 104b. In order to mount the hand phone 140, the battery 103 must be rotated to the outside of the portable computer 100.

After the battery 103 has been rotated and moved, the female connection part 141 formed on the inner side of the lower part of the hand phone 140 is mounted on the hand phone mounting or dismounting part 104a formed on the lower left part of the portable computer 100.

At the same time, the mounting or dismounting part 142 formed on the hand phone 140 is mounted on the hinge 104b formed on the upper left side of the portable computer 100 by exerting a certain pressure. The mounting or dismounting part 142 prevents separation of the phone 140 from portable computer 100 because its size corresponds to the size of the hinge 104b, thereby facilitating insertion and interconnection.

Figure 4:
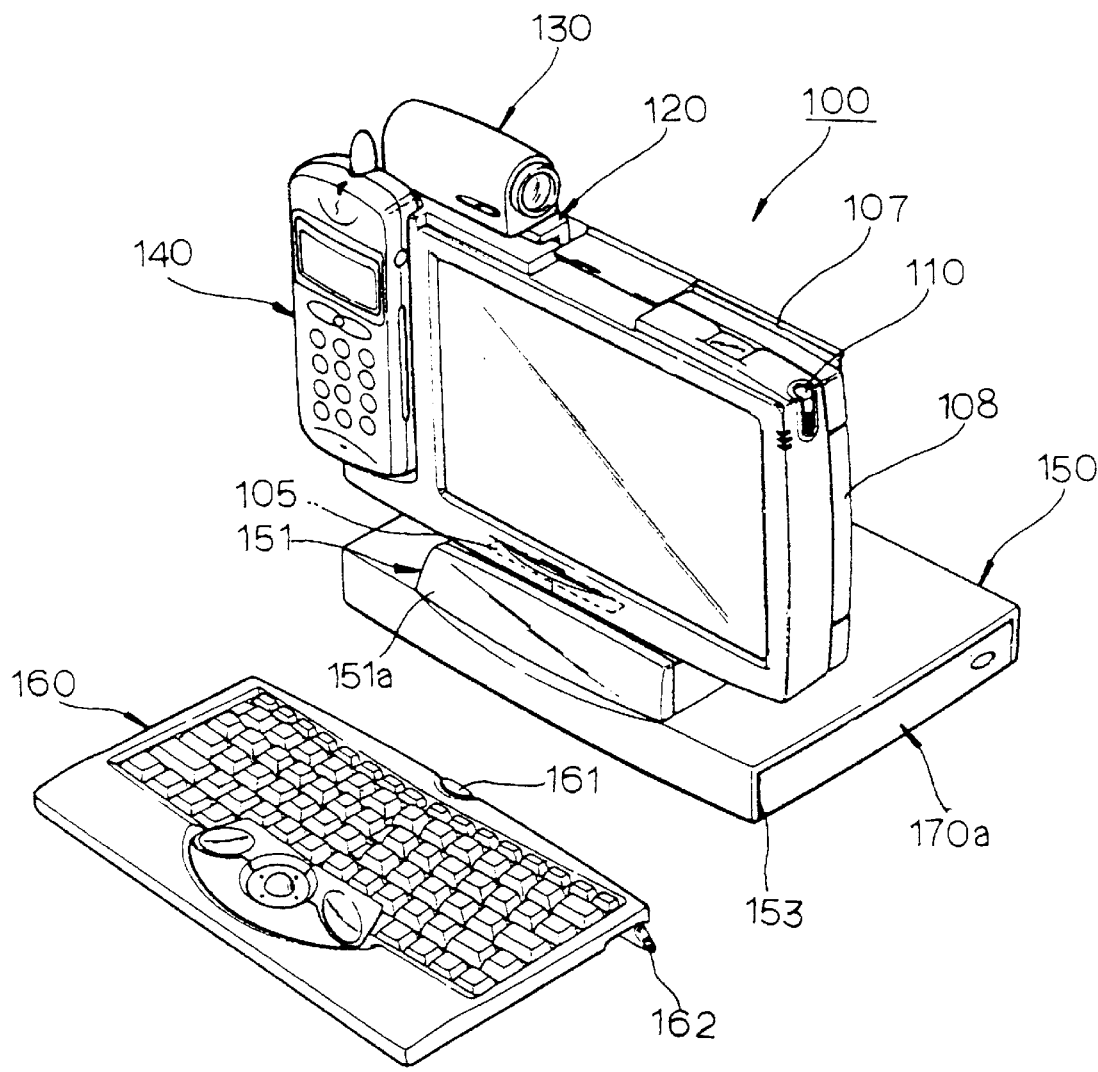
FIG. 4 and FIG. 5 are perspective views of the multimedia apparatus using the portable computer according to the present invention.
Figure 5:
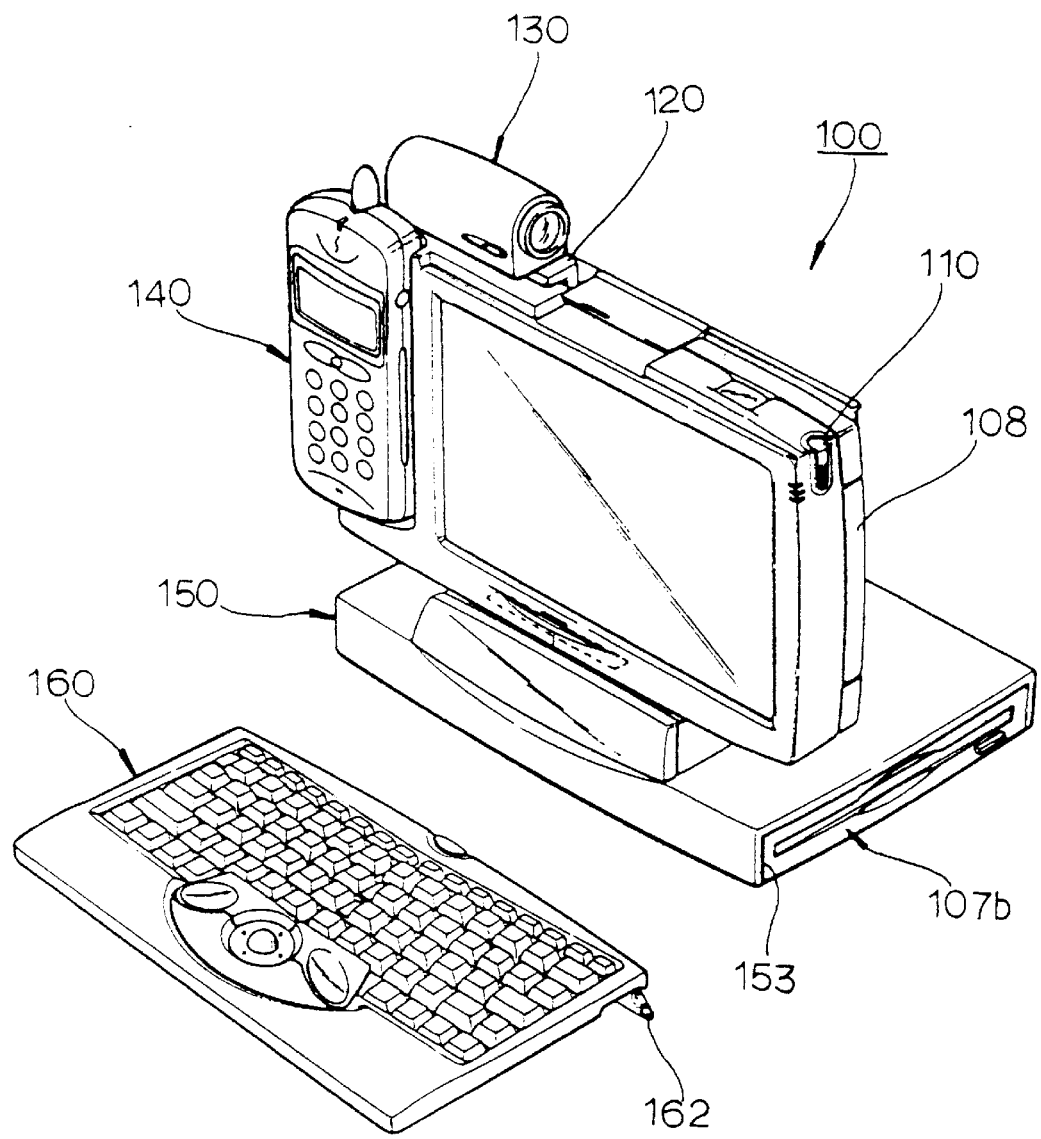

The manner in which the portable computer 100 is mounted on the stand 150 is illustrated in FIG. 4 and FIG. 5. More particularly, the first connection part 105 formed on the lower side of the portable computer 100 is so disposed as to be inserted into the second connection part 152 (FIG. 1) formed on the mounting part 151 of the stand 150.

The second connection part 152, which is formed to be mounted on or dismounted from the first connection part 105 formed on the lower side of the portable computer 100, can be formed on the top part of the stand 150. Furthermore, the first connection part 105 can be formed as a female connection part, and the second connection part 152 can be formed as a male connection part, although the reverse is also possible.

When the portable computer 100 is mounted on the second connection part 152, a signal connector 152a formed on the inner side of the second connection part 152 is connected to a connector (not illustrated) formed on the inner side of the first connection part 105 formed on the lower side of the portable computer 100.

When the portable computer 100 is mounted on the stand 150, signals transmitted to a light receiving part 151a formed on the mounting part 151 of the stand 150 are transmitted to the portable computer 100 through an inner circuit of the stand 150.

The light receiving part 151a receives IR generated by IR radiating part 161, converts it into electric signals, and transmits the electrical signals to the portable computer 100. The support 162 formed on the keyboard 160 is naturally formed at a certain angle so as to accurately transmit IR to the light receiving part 151a.

Figure 6:
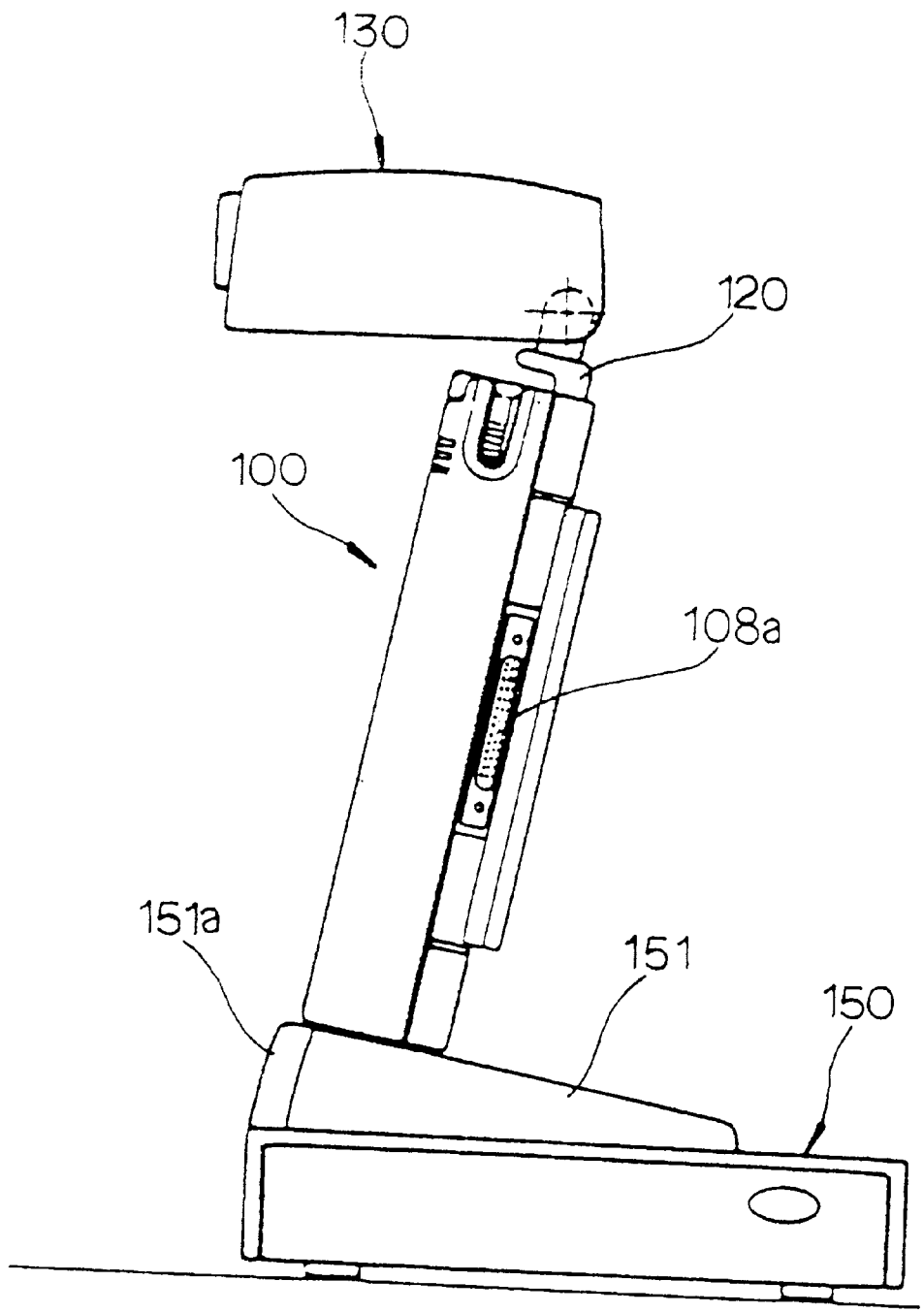
FIG. 6 is a side view of the multimedia apparatus using the portable computer.

Furthermore, the mounting or dismounting part 153 formed on the right side of the stand 150 is designed to be used to mount or dismount an auxiliary peripheral device such as DVDP 170a (FIG. 4) or FDD 170b (FIG. 5). As seen in FIG. 6, when the cover 108 for the print connector 108a is opened, the print data provided through print connector 108a from the portable computer 100 can be printed on a printer (not shown).

The use of the digital camera 130 generating picture signals will be understood from the attached drawings as follows.

Figure 7:
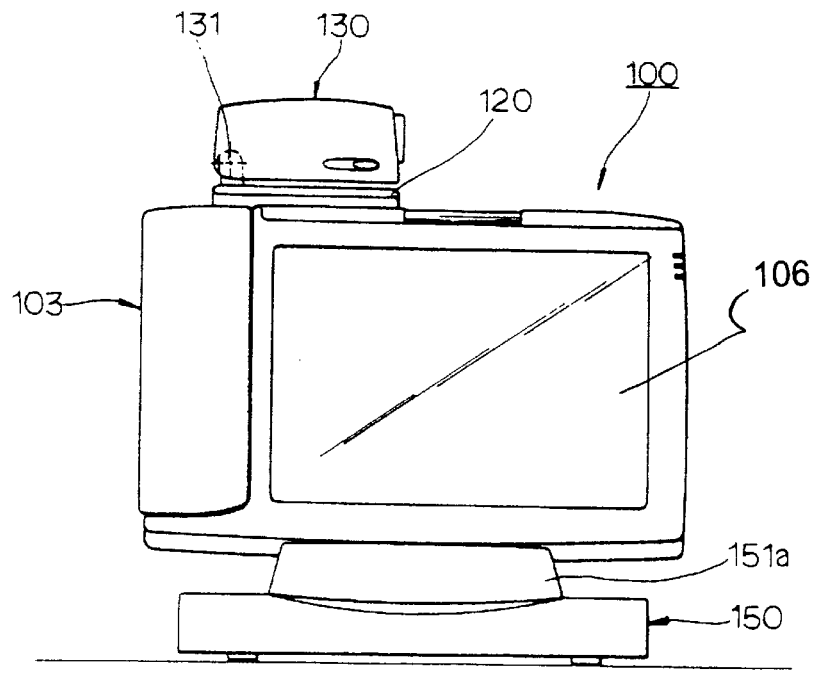
FIG. 7 and FIG. 8 are a front view and a side view, respectively, of the portable computer before rotational movement of a digital camera mounted on the portable computer.
Figure 8:
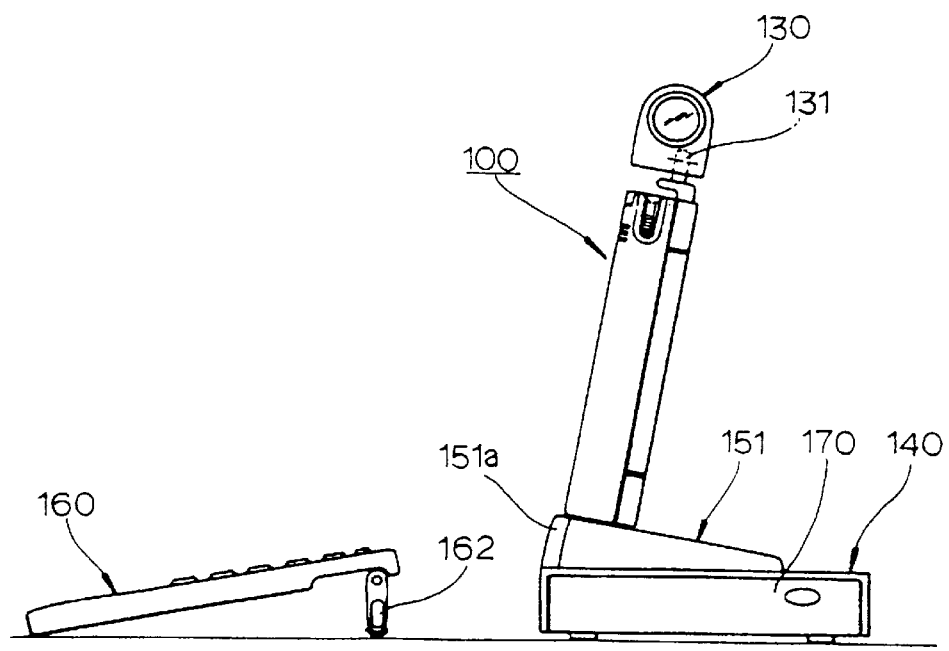

FIG. 7 and FIG. 8 show the pre-rotated state of the digital camera 130 mounted on the portable computer 100. The digital camera 130 is mounted on the PCMCIA card 120 along a lengthwise direction of LCD panel 106, and rotates on an axis of the hinge 131.

Figure 9:
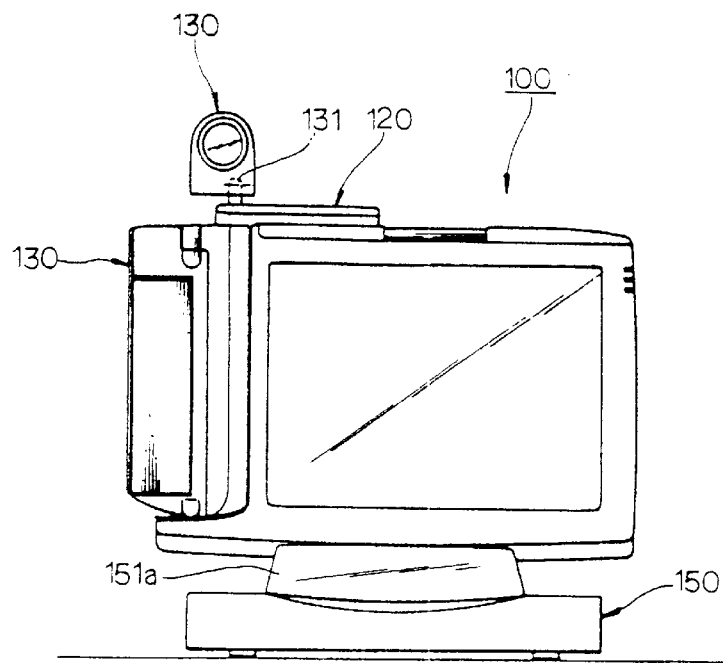
FIG. 9 and FIG. 10 are a front view and a side view, respectively., of the portable computer after rotational movement of the digital camera mounted on the portable computer.
Figure 10:
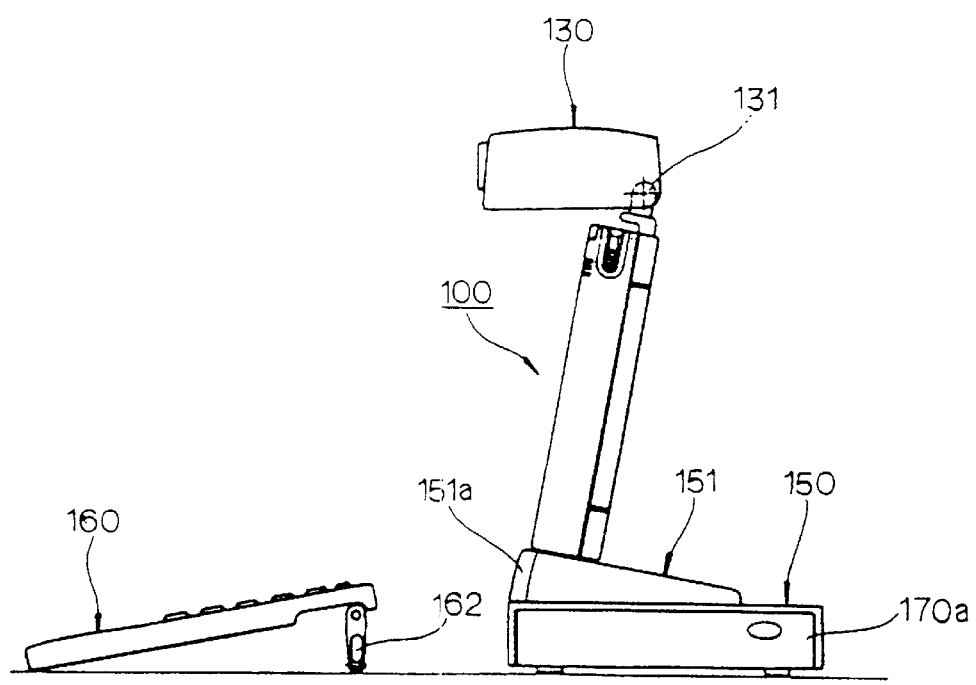

FIG. 9 and FIG. 10 show the post-rotation state of the digital camera 130, rotated so as to point in the direction of the keyboard 160.

In other words, if a user rotates the digital camera 130 in the direction of the keyboard 160 with a certain force, the digital camera 130 is moved into the post-rotation state shown in FIG. 9 and FIG. 10 after being rotated around the hinge 131.

The dismounting of the portable computer 100 and the stand 150, including the digital camera 130 and the hand phone 140 mounted thereon, is accomplished by reversing the mounting order, as described above. Mounting or dismounting is possible, as the user desires.

As shown in the above, in accordance with being provided with a stand on which the portable computer can be mounted or dismounted, the present invention offers the user the opportunity to more readily mount or dismount every kind of multimedia apparatus on the portable computer as a single unit.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A multimedia apparatus, comprising:
    a portable computer which includes a first connection part disposed on a lower side thereof; and a stand which includes a second connection part located on an upper side thereof, said second connection part being detachably connected to the first connection part of said portable computer, whereby said portable computer can be used in a mounted state wherein it is mounted on said stand, and in a dismounted state;

wherein said portable computer includes a mounting part for holding an electromagnetic pen mounted on said portable computer, said mounting part comprising a vertical side portion of said portable computer having a mounting hole formed therein for receiving said electromagnetic pen, said mounting hole extending in a vertical direction when said portable computer is mounted on said stand.

2. The multimedia apparatus as claimed in claim 1, wherein said portable computer includes a connector for connecting a printer and a cover overlying and protecting the connector.

3. The multimedia apparatus as claimed in claim 1, wherein said stand includes a light receiving part for receiving infrared rays transmitted thereto.

4. The multimedia apparatus as claimed in claim 1, wherein said stand includes mounting means for mounting an auxiliary peripheral device for use with the portable computer.

5. A multimedia apparatus comprising:

a portable computer which includes a first connection part disposed on a lower side thereof; and a stand which includes a second connection part detachably connected to the first connection part of said portable computer, whereby said portable computer can be used in a mounted state wherein it is mounted on said stand, and in a dismounted state;

wherein said portable computer includes mounting means for mounting a battery supplying a source of electricity, said mounting means including a hinge disposed on, and extending vertically along, a vertical side portion of said portable computer, said battery being rotatably fixed to said vertical side portion by said hinge; and wherein said portable computer includes additional mounting means disposed on the vertical side portion of said portable computer for mounting a phone on said portable computer.

6. The multimedia apparatus as claimed in claim 5, wherein said battery is rotatable about said hinge between a first position next to said portable computer and a second position away from said portable computer, and said phone is mounted on said portable computer when said battery is in said second position.

7. A multimedia apparatus, comprising:

a portable computer including a base and a display unit supported by said base;

mounting means disposed on a vertical side of said display unit for mounting a battery supplying electricity to said portable computer, said mounting means comprising a hinge extending vertically along the vertical side of said display unit, said battery being rotatably fixed to said vertical side of said display unit by said hinge; and additional mounting means disposed on the vertical side of said display unit for mounting a phone on said portable computer.

8. The multimedia apparatus as claimed in claim 7, wherein said portable computer includes a mounting part for holding an electromagnetic pen mounted on said portable computer.

9. The multimedia apparatus as claimed in claim 7, wherein said portable computer includes a connector for connecting a printer and a cover overlying and protecting the connector.

10. The multimedia apparatus as claimed in claim 7, wherein said stand includes a light receiving part for receiving infrared rays transmitted thereto.

11. The multimedia apparatus as claimed in claim 7, wherein said stand includes mounting means for mounting an auxiliary peripheral device for use with the portable computer.

12. The multimedia apparatus as claimed in claim 7, wherein said battery is rotatable about said hinge between a first position next to said portable computer and a second position away from said portable computer, and said phone is mounted on said portable computer when said battery is in said second position.

13. A multimedia apparatus, comprising:

a portable computer including a base and a display unit supported by said base;

first mounting means disposed in said base for mounting an auxiliary peripheral device in said base for use with said portable computer;

second mounting means for mounting a battery supplying a source of electricity, said second mounting means including a hinge disposed on, and extending vertically along, a vertical side of said display unit, said battery being rotatably fixed to said vertical side of said display unit by said hinge; and third mounting means disposed on the vertical side of said display unit for mounting a phone on said portable computer.

14. The multimedia apparatus as claimed in claim 13, wherein said auxiliary peripheral device comprises at least one of a floppy disk drive and a digital video disk player.

15. The multimedia apparatus as claimed in claim 13, wherein said portable computer includes a mounting part for holding an electromagnetic pen mounted on said portable computer.

16. The multimedia apparatus as claimed in claim 13, wherein said portable computer includes a connector for connecting a printer and a cover overlying and protecting the connector.

17. The multimedia apparatus as claimed in claim 13, wherein said stand includes a light receiving part for receiving infrared rays transmitted thereto.

18. The multimedia apparatus as claimed in claim 13, wherein said battery is rotatable about said hinge between a first position next to said portable computer and a second position away from said portable computer, and said phone is mounted on said portable computer when said battery is in said second position.

* * * * *